Reissued Feb. 26, 1935

Re. 19,475

UNITED STATES PATENT OFFICE 19,475

METHOD AND MATERIAL FOR REPAIRING SHOES

Roland R. Bollman, Mount Washington, and Conrad L. Ornes, Cincinnati, Ohio, assignors to The Perfect Manufacturing Company, Cincinnati, Ohio, a corporation of Ohio No Drawing. Original No. 1,913,328, dated June 6, 1933, Serial No. 565,922, September 29, 1931. Application for reissue June 11, 1934, Serial No. 730,148

3 Claims. (Cl. 18—53)

This invention relates to a process of repairing worn shoes and similar articles. The invention likewise relates to products adapted to be used in the repairing of worn shoes.

The object of the invention is to provide a process and products by which the ordinary individual may repair his or her worn shoes without the employment of special technical skill and without the use of apparatus or equipment or facilities not readily at hand in the ordinary home.

The invention comprises three steps, the first of which is to roughen the sole of the shoe somewhat, the second of which is to apply an adhesive liquid coating to the roughened sole, and the third of which is to apply a plastic, moldable, workable material to the adhesive liquid coating to build or reconstitute the sole to the desired thickness and proportions. The heel of the shoe may, of course, be similarly repaired.

From the point of view of marketing the process and products to the public, it is necesary to provide liquid coating compositions and plastic materials which do not harden in the containers in which they are marketed. For the purpose of providing a strong, new shoe sole it is requisite that the plastic material harden very materially when applied to the shoe. The invention may therefore be said to reside in the discovery and determination that a liquid coating composition comprising rubber cement and an accelerator of vulcanization, but no sulfur, and a plastic material comprising rubber and sulfur, but no accelerator of vulcanization, constitutes a combination possessed of the necessary properties specified above.

The rubber cement does not harden in the container because no sulfur is present. The plastic material does not harden or vulcanize in the container due to the absence of an accelerator of vulcanization. When, however, the rubber cement with the accelerator in it is applied to the shoe, and the plastic material containing rubber and sulfur placed over it, a gradual migration of the vulcanization accelerator takes place which causes a progressive vulcanization of the new sole constituted by the plastic material at ordinary room temperature without the use of molds or heat.

In practice the shoe sole is roughened and two coatings of the liquid rubber cement applied. When the second coating becomes tacky, the plastic material containing the rubber is molded over the rubber cement either with a knife or with the fingers. After standing overnight, the new sole is sufficiently hardened to permit the wearing of the shoes. Further hardening takes place over a period of several days.

In the plastic material it is usually desirable to incorporate fibers, fillers, rubber tougheners, and other ingredients frequently used in the compounding of rubber products. A wide latitude of selection of materials responsive to this invention is therefore possible. Recommended rubber tougheners comprise zinc oxide and carbon black. A rubber solvent such as benzol is preferably used in the plastic to render it appropriately workable. Asbestos is a very appropriate fiber, though other types of fiber may be selected. The filler may be clay dust or Portland cement, or any analogous finely divided material.

The vulcanization accelerators used in the rubber cement may be tetra-methyl-thiuram-disulfide; also tetra-methyl-thiuram-monosulfide, di-thio-carbamates, such as zinc-di-methyl-di-thio-carbamate, lead-di-methyl-di-thio carbamate, or di-phenyl-guanidine. The selection of the particular accelerator in regard to the selection of the ingredients for the plastic is within the skill of the art.

One example responsive to this invention is as follows:

*Formula for plastic*

| | |
|---|---|
| Rubber | 70 pounds |
| Asbestos | 100 pounds |
| Portland cement | 100 pounds |
| Rosin | 1 pound |
| Sulfur | 7 pounds |
| Zinc oxide | 7 pounds |
| Carbon black | 5 pounds |
| Stearic acid | 1.5 pounds |
| Benzol | 40 gallons |

In compounding this mixture, all the dry ingredients except the rubber are placed in the mixer with sufficient benzol to wet them thoroughly, and the mixer is run for fifteen minutes. Thin sheets of crepe rubber are dipped in benzol and added to the churning mass one at a time until all are in. The remaining benzol is added from time to time to keep the mass fluid. The mixer is run for one and a half or two hours, depending on the type of mixer, or until the proper consistency is obtained.

*Formula for cement*

| | |
|---|---|
| Rubber | 6 pounds |
| Rosin | 2.5 pounds |
| Benzol | 15 gallons |
| Zinc-di-methyl-di-thio-carbamate (or other ultra-accelerators) | 1.5 pounds |

These ingredients are added to the benzol and stirred until the rubber is dissolved. Two coats of this cement are applied to the roughened shoe sole and allowed to dry. The plastic is then applied about one-fourth inch thick and allowed to dry overnight. The shoes may then be worn, but may not reach their final and complete cure for two more days.

The plastic or workable qualities of the plastic material above described, or other plastic materials responsive to this invention, may be further increased by the addition to the admixture of materials such as ethyl or methyl alcohol, isopropyl alcohol, acetones or other ketones or alcohols comprising as a class materials which are not solvents for rubber but which are admixable with benzol or the rubber solvent selected for practicing the invention. As an example, 25 pounds of ethyl alcohol of about 90–95% strength may be added to the above-specified admixture and the plastic or workable qualities of the material are thereby improved.

Having described our invention, we desire to be limited only by the ensuing claims.

1. A method of repairing worn shoe soles, said method comprising, molding a plastic rubber composition comprising rubber, a volatile solvent therefor, alcohol and sulfur into substantially the shape adapted to constitute the desired repair, securing said plastic material to the shoe by means of a rubber cement containing a room temperature accelerator of vulcanization and drying, hardening and curing said plastic material at substantially room temperature on said shoe by reason of the simultaneous evaporation of the rubber solvent and the migration of said accelerator into the plastic composition.

2. A method of repairing worn shoe soles, said method comprising, molding a plastic rubber composition comprising rubber, a volatile solvent therefor, and sulfur, into substantially the shape adapted to constitute the desired repair, securing said plastic material to the shoe by means of a rubber cement containing a room temperature accelerator of vulcanization and drying, hardening and curing said plastic material at substantially room temperature on said shoe by reason of the simultaneous evaporation of the rubber solvent and the migration of said accelerator into the plastic composition.

3. A method of repairing articles made of rubber, leather, and the like, said method, comprising, molding a plastic rubber composition comprising rubber, a volatile solvent therefor, and sulfur, substantially into the shape to constitute the desired repair, securing said molded plastic material to the article being repaired by means of a rubber cement containing a room temperature accelerator of vulcanization, and hardening and curing said plastic material at substantially room temperature by reason of the simultaneous evaporation of the rubber solvent and the migration of said accelerator into the plastic composition.

ROLAND R. BOLLMAN.
CONRAD L. ORNES.